(12) United States Patent
D'Amato (10) Patent No.: US 7,072,162 B2
(45) Date of Patent: Jul. 4, 2006

(54) BI-DIRECTIONALLY DRIVEN FORWARD CONVERTER FOR NEUTRAL POINT CLAMPING IN A MODIFIED SINE WAVE INVERTER

(76) Inventor: James D'Amato, 142 Fairview Ave., Deer Park, NY (US) 11729-6532

( * ) Notice: Subject to any disclaimer, the term of this patent is extended or adjusted under 35 U.S.C. 154(b) by 344 days.

(21) Appl. No.: 10/716,983

(22) Filed: Nov. 19, 2003

(65) Prior Publication Data

US 2005/0105237 A1 May 19, 2005

(51) Int. Cl.
*H02H 9/00* (2006.01)

(52) U.S. Cl. .................................................. 361/91.7
(58) Field of Classification Search ................ 361/91.7
See application file for complete search history.

(56) References Cited

U.S. PATENT DOCUMENTS

| | | | |
|---|---|---|---|
| 3,432,737 A | | 3/1969 | Hunter |
| 4,128,868 A | * | 12/1978 | Gamble ........................ 363/26 |
| 4,564,895 A | | 1/1986 | Glennon |
| 4,670,828 A | | 6/1987 | Shekhawat |
| 5,091,841 A | * | 2/1992 | Tuusa ........................... 363/98 |
| 6,108,220 A | * | 8/2000 | Franke ......................... 363/37 |

* cited by examiner

*Primary Examiner*—Stephen W. Jackson (57) ABSTRACT

A bi-directionally driven forward converter for neutral point clamping in a modified sine wave inverter maintains wave shape integrity when the half bridge output is subjected to loads of varying impedances. This bi-directionally driven forward converter is supported by a dual primary coupled to a common secondary transformer of which both primaries are wound in opposition to each other. A high frequency snubbing pulse generator outputs a series of pulses coincidental with the turn off of the half bridge power transistors and pending the polarity of the modified sine wave output would permit current flow through either of the two primary windings. Given that the transformer secondary voltage is ultimately rectified, filtered, and tied to the input of the inverter itself, reflects back an impedance to the primary winding that is non-dissipative. The series of pulses emanating from the snubbing pulse generator ultimately suppresses any reverse voltage transients developed as a result of the load during the dead time of the modified sine wave output thereby maintaining the output wave shape under the most adverse applied conditions.

13 Claims, 6 Drawing Sheets

BI-DIRECTIONALLY DRIVEN FORWARD CONVERTER FOR NEUTRAL POINT CLAMPING IN A MODIFIED SINE WAVE INVERTER

REFERENCES CITED

| U.S. Pat. No. | Date | Inventor(s) |
|---|---|---|
| 6,108,220 | August 2000 | Franke |
| 6,016,095 | January 2000 | Herbert |
| 5,373,433 | December 1994 | Thomas |
| 5,258,902 | November 1993 | Lindbery |
| 5,130,917 | July 1992 | Shekhawat |
| 5,091,841 | February 1992 | Tuusa |
| 4,961,129 | October 1990 | Shekhawat |
| 4,903,188 | February 1990 | Madhavan, et al. |
| 4,862,342 | August 1989 | Dhyanchand, etal. |
| 4,849,873 | July 1989 | Vanderhelst |
| 4,802,078 | January 1989 | Hill |
| 4,706,177 | November 1987 | Josephson |
| 4,670,828 | June 1987 | Shekhawat, et al. |
| 4,639,849 | January 1987 | Norworolski, et al. |
| 4,614,998 | September 1986 | Rilly |
| 4,602,322 | August 1986 | Henderson |
| 4,564,895 | January 1986 | Glennon |
| 4,493,017 | January 1985 | Kammiller, et al. |
| 4,443,841 | April 1984 | Mikami, et al. |
| 4,339,791 | July 1982 | Mitchell |
| 4,128,868 | December 1978 | Gamble |
| 4,063,306 | December 1977 | Perkins, et al. |
| 3,432,737 | March 1969 | Hunter, et al. |
| 3,286,155 | November 1966 | Corey |
| 3,207,974 | September 1965 | McMurray |
| 3,125,726 | March 1964 | Clifton |

FEDERALLY SPONSORED RESEARCH

Not Applicable

SEQUENCE LISTING OR PROGRAM

Not Applicable

1. Field of the Invention

This invention relates to electronic power inverters that converts direct current to alternating current in the form of what is recently termed a modified sine wave and more specifically addresses the issue of maintaining a fairly constant output voltage when subjected to a diverse range of applied loads including inductive loads of varying orders of magnitude.

2. Prior Art of the Invention

For power levels less than one horsepower, converting DC to AC has been accomplished many ways originating with transformers and vacuum tubes. When vacuum tubes were replaced with semiconductor devices, the basic topology of DC-AC inversion basically remained unchanged. Self-oscillating circuits were of the simplest type where positive feedback from an isolated transformer winding created the appropriate drive signal to operate the transformer in either a saturated or unsaturated state accomplishing the task of creating AC power from a DC source using the minimal number of components. Oscillation frequency was entirely dependant upon the primary inductance of the power transformer and in order to provide a standard output frequency of 60 Hertz, would necessitate the use of a very heavy transformer composed of laminated alloy plates. Pending the input voltage, the quantity of primary turns was usually very high and transformer losses were also typically high, especially when driven into saturation. Having high peak currents, the power dissipation in the active devices could grow quickly. Typical active devices used were either silicon controlled rectifiers (SCR) or bipolar junction transistors (BJT). U.S. Pat. No. 3,207,974 is an example of an early stage type inverter employing SCR's as the active switching elements.

A problem associated with these types of self-oscillating circuits was that any variation at the input voltage would be directly transformed to the output by a factor of the turns ratio thereby producing a somewhat poor line regulation. Attempting to regulate the input voltage prior to the transformer would typically yield undesirable losses and would also be an impeding factor for producing maximum output power. Pulse width modulation (PWM) was a way of maintaining a constant input voltage to the transformer. U.S. Pat. No. 3,432,737 by Hunter, et al. dated Mar. 11 1969 displays the functional blocks used within the early stages of a PWM driven transformer. Once PWM technology became available in an integrated circuit with an incorporated error amplifier, voltage reference, and provided maximum pulse width protection, input line regulation was vastly improved however a basic change in inverter topology was still needed.

Also characteristic of power transforming self-oscillating circuits without the aid of added inductance for wave shaping at the output is that the output is non-sinusoidal and entirely a square wave. The root mean square (RMS) value of the square wave differs from a sinusoid and to adjust for this variation, the quantity of secondary turns of the power transformer would have to be lowered. Interfacing equipment could recognize this change whether it is a transformed isolated input or a direct off line input. If a transformer input is expecting to be excited with a sinusoid now experiences a square wave, a regenerative voltage spike would be reflected back at each output voltage transition as a result of stored energy contained in the primary winding of the load. This in itself could be damaging to the output of the inverter or input of the interfacing equipment. If the interfacing equipment has an input that peak detects, a lowered input voltage could also affect its normal operation.

Topology change also assisted the improved performance of DC-AC power inverters. Using a step up dc—dc converter prior to any power switch increases conversion efficiency and allows the use of smaller and lighter transformers. The generated differential high voltage determines the peak amplitudes of the output pulses when composing the first order approximation of a sine wave. In a half bridge configuration, typically used, one point of the load is connected to the neutral and the other end of the load is connected to the drive that could be clamped to either the positive or negative high voltage by way of an active device. In a similar way, U.S. Pat. No. 5,091,841 by Tuusa dated Feb. 25, 1992 also discusses the method for creating a pulse width modulator for the control of solid state switches in a three phase frequency converter and rectifier/inverter bridges yet lacks in discussing the method of filtering the final outputted power pulses. This filtering method is extremely important when again interfacing to a wide range of applied loads including and especially those of highly inductive impedances. When not clamped, a high impedance appears across the load and if the load were inductive would create a reverse voltage transient that opposes the previously clamped voltage pulse. A few patents have been composed to address this problem since inductive loads could become destructive to the drive circuitry, the load itself, and generate unnecessary higher order harmonics.

U.S. Pat. No. 4,564,895 by Glennon dated Jan. 14, 1986 entitled 'Neutrally Clamped PWM Half-Bridge Inverter' addressed the issue by incorporating a bi-directional switch however the drive to the load is pulse width modulated and the filter components used typically address a specific type of load whether it be resistive or inductive. U.S. Pat. No. 4,670,828 by Shekhawat, et al. dated Jun. 2, 1987 entitled 'Bi-directional switch for neutral point clamped PWM inverter' follows Glennon in a similar manner. Creating a pulse width modulated drive from a half bridge configured source has the objective of developing a sinusoid current to the load. In doing so, a filter is required prior to the load that typically necessitates a series inductor with some capacitance and this type of filtering restricts the variation of applied load impedance without accepting waveform distortion. A modified sine wave inverter that produces a first order wave shape of a sine wave is a precedent to the PWM inverter however lacking any type of filtering and when subjected to inductive loads, could result with damaging effects to both the drive and the load.

OBJECTS AND ADVANTAGES

The presented invention displays several objects and advantages that are:
(a) to provide a first order approximation of a sine wave for the purpose of driving a diverse range of load impedances without the adverse side effects of load generating spikes at applied voltage transitions
(b) to provide a first order approximation of a sine wave at the output when absolutely no load is applied
(c) to provide a first order approximation of a sine wave in that the loadings affects only the amplitude of the output and due to the differential supply prior to the half-bridge output
(d) to provide an efficient snubbing circuit that maintains the output to be a first order approximation of a sine wave
(e) to provide efficient regenerative use of the inductive load producing reverse voltage transitions
(f) to provide a clamp for any reverse voltage transitions in that each transition does not substantially exceed the differential source voltages
(g) to provide two means by which the degree of snubbing can be varied Further objects and advantages may become apparent when viewing the ensuing schematics and diagrams.

SUMMARY

In accordance with the present invention, the half bridge converter and its developing of a modified sine wave is susceptible to damage as a result of transients generated by an inductive load. Making use of a bi-directional high frequency forward converter for output neutral point clamping ensures the waveshape in the time domain for the first order approximation of the output sine wave.

DIAGRAMS

The block diagram on page 1 shows the independent functional blocks used within the inverter in addition and to support the bi-directional driven transformer functioning as a forward converter for active snubbing.

The diagrams on page 2 show waveforms that correspond to inputs and outputs of each functional block depicted in the block diagram on page 1.

The diagrams of page 3 show an expansion of timing between several areas within the block diagram on page 1.

The diagrams on page 4A show the output of the half-bridge driven modified sine wave inverter less the inclusion of the bi-directional forward converter for neutral point clamping. Each waveform within shows the output under a different applied type load.

FIG. 4A1 shows the inverter output completely unloaded.

FIG. 4A2 shows the output with a purely resistive load of high resistance.

FIG. 4A3 shows the output with a purely resistive load of lowered resistance.

FIG. 4A4 shows the output with a purely resistive load of more lowered resistance.

FIG. 4A5 shows the output with a purely inductive load with a low internal resistance.

FIG. 4A6 shows the output with a purely inductive load of increased inductance and low internal resistance.

FIG. 4A7 shows the output with a purely inductive load of very high inductance and low internal resistance.

FIG. 4A8 shows the output with a parallel combination of an inductor and resistor where the inductance is high, internal resistance is low, and the shunt resistor has medium resistance.

FIG. 4A9 shows the output with a parallel combination of an inductor and resistor where the inductance is high, internal resistance is low and the shunt resistor is low.

The diagrams on page 4B show the output of the half-bridge driven modified sine wave inverter with the inclusion of the bi-directional driven forward converter for neutral point clamping. Each waveform within shows the output under a different applied type load and directly corresponds to each figure depicted in FIG. 4A.

The diagrams on page 5 show the components used within the bi-directional forward converter that satisfy a given load condition and together construct the bi-directional forward converter in its entirety.

Figure 1:
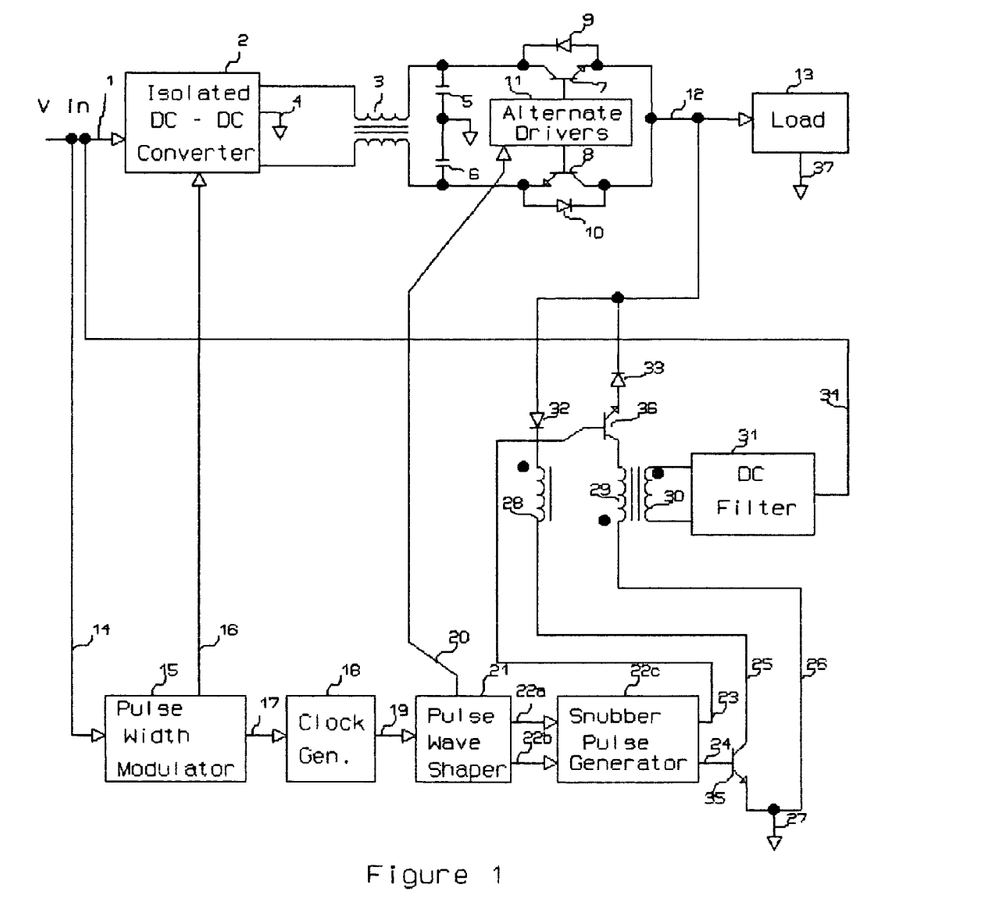

DETAILED DESCRIPTION—FIGS. 1, 2, AND 3—PREFERRED EMBODIMENTS

The functional elements of the basic modified sine wave converter are shown in the block diagram of FIG. 1. Although this invention applies to the bi-directional forward converter for neutral point clamping used within, it is felt necessary to address components used for the drive that support the converter in addition to the output for which the converter interfaces. This will ultimately yield a more thorough understanding of its operation.

A source voltage 1 is applied to the input of the isolated dc—dc converter 2 which is supported by a pulse width modulator 15 having its own internal oscillating frequency. The source voltage I is also applied to the pulse width modulator 15 via line 14 to operate its internal circuitry. The output of the isolated dc—dc converter 2 is a differential voltage of approximately 280–330 vdc with center tap 4 connected to the return of the modified sine wave output and the return of the input source voltage 1 is completely isolated from the return of the output 27. A bipolar wound inductor 3 performing as a common mode choke provides the filtering of the generated high voltage in conjunction with fairly high valued capacitors 5 and 6. Having 140–165 vdc at the collector of transistor 7 and emitter of transistor 8, and when driven by the alternate drivers within 11 provide the switching functions for the main power output producing a first order approximation of a sine wave to the load 13. Diodes 9 and 10 are reversed biased protection diodes for respective transistors 7 and 8 and although their primary function is to protect the transistor associated with each, when the transistor is not conducting maintain the output voltage at approximately the same voltage as the capacitor 5 or 6 voltage.

Figure 2A:
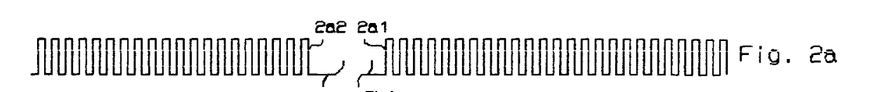

The pulse width modulator 15 produces the appropriate drive output 16 in the format of a high frequency (20 KHz–100 KHz) time varying pulse width dependent upon a feedback mechanism whether it be the input voltage 1, an isolated signal from the output, or a combination of both. FIG. 2a shows the output of the pulse width modulator and although does not detail actual pulse width, does become the baseline clock input for future generated outputs. In actuality, and in referring to FIG. 2a, leading edge transition 2a1 remains fixed and varying the pulse width adjusts trailing edge 2a2 with time. The output drive 16 for the dc—dc converter 2 is composed of two outputs and each output is a totem pole output for increasing the drive capability for the dc—dc converter 2. Within the dc—dc converter 2 in itself is typically a push-pull configured transformer supported by drive transistors with protective snubbing elements that efficiently transforms the input voltage to another voltage providing return isolation.

Figure 2B:
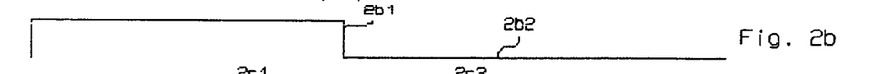

In addition to providing a drive for the dc—dc converter 2, the pulse width modulator 15 provides the self oscillating frequency as an input 17 for the dock generator 18 and it produces the primary output frequency of the modified sine wave converter. FIG. 2b shows the output 19 from the clock generator where 2b1 is high and 2b2 a low. Although 60 Hz is a fundamental frequency used within North America, the clock generator can generate any frequency from 47 Hz through 420 Hz covering European, North American, and US military ac power. Internal to the clock generator 18 is a divide-by counter integrated device that outputs a logic level transition for each predesignated count of input pulses producing a logic level square wave at output 19.

Figure 2C:
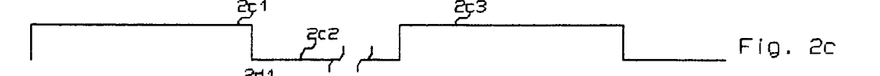
Figures 2D, 2E:
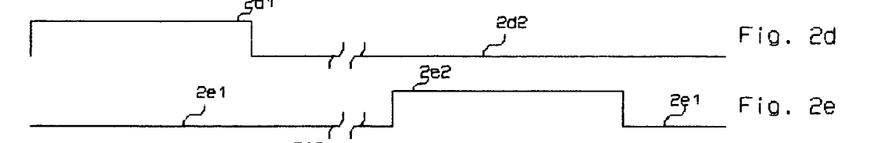

Having a square wave at the input 19 for the pulse wave shaper 21, the function of the pulse wave shaper 21 is to provide two sets of outputs. Each set of outputs truncates the time duration of the logic level input square wave for determining the main output power pulse and sets the time duration for activating the bi-directional forward converter. FIG. 2c is a time-compressed representation of 2b showing the square wave with ordinary logic levels 2c1 and 2c2 at the input 19 to the pulse wave shaper. Within the pulse wave shaper 21, the clocked input 19 is divided into two paths. FIG. 2d would ultimately correspond to output 22a and whose pulse is coincident with the first pulse 2c1 within FIG. 2c. FIG. 2e would ultimately correspond to output 22b and whose pulse is coincident with the second pulse 2c3 within FIG. 2c. Both signals in FIGS. 2d and 2e would be routed via 20 to the alternate drivers within 11 to set the time duration of the respective positive and negative output power pulse. After both signals within the pulse wave shaper 21 are divided and at the trailing edge of each, a monostable multivibrator is enabled creating a much shorter pulse. Positive pulse 2f2 within FIG. 2f would be the bi-directional forward converter enabling pulse initiated upon the trailing edge of 2d1 within FIG. 2d and positive pulse 2g2 within FIG. 2g would be the bi-directional forward converter enabling pulse initiated upon the trailing edge of 2e2 within FIG. 2e. Both positive pulses 2f2 and 2g2 transcending from ground states 2f1 and 2g1 in FIGS. 2f and 2 become inputs to the snubbed pulse generator 22c.

Figure 2F:
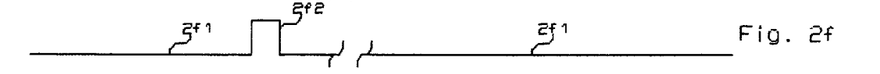
Figures 2G, 2H:
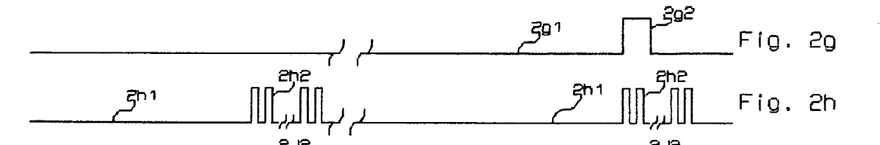

The functions of the snubber pulse generator 22c are to combine the positive pulses in FIGS. 2f and 2g in an 'OR' gate fashion, to enable only one internal high frequency, high power oscillator, and have an adequate base drive so as to drive transistors 35 and 36 in FIG. 1. The internal high power oscillator is gated from 'OR'ing the signals in FIGS. 2f and 2g. The frequency of the internal high power oscillator need not be related to any other frequency used or be synchronous in any way with the pulse width modulator's internal clock. The requirement for the internal high power oscillator is that it be high enough for delivering a minimum of 250 pulses to transistors 35 and 36 during its gate time.

Figure 2J:
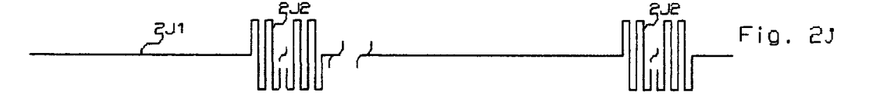

The bi-directional forward converter transformer is comprised of three windings where two windings 28 and 29 act as independent primaries having identical turns both coupled to one secondary 30. A series of consecutive drive pulses, as shown in FIG. 2h, emanating from the snubber pulse generator 22a drive both transistors 35 and 36 simultaneously. When the output on 12 is high, diode 32 is forward biased and the voltage across winding 28 is transformed to secondary winding 30 having current flow through the collector of transistor 35. Waveform 2j2 of FIG. 2j shows the collector voltage of transistor 35 when 12 is positive, diode 32 is forward biased and its base is excited with the waveform within 2h. The same waveform could also be used to represent the collector waveform of transistor 36 when 12 is negative, diode 33 is forward biased and its base is excited with the waveform within FIG. 2h. Both waveforms in FIG. 2h and FIG. 2j originate from ground 2h1 and neutral state 2j1 respectively. Using superposition, when there is a voltage across winding 28, there would also be a resultant voltage across winding 29 however if the output at 12 is high, diode 33 would be reversed biased thereby disallowing current flow through winding 29. Conversely, if the output 12 is negative, diode 33 is forward biased and the voltage across winding 29 is transformed to secondary winding 30 having current flow through the collector of transistor 36. Using superposition, with a voltage across winding 29 there would be a resulting voltage across winding 28 however if the output at 12 is negative, diode 32 would be reversed biased thereby again disallowing current flow through winding 28. The dot convention for transformer windings indicates that the transformer is operating in the forward converter mode. Providing the type of ferrite core material used for the bi-directional transformer dictates the inductance for each primary and determines the snubbing circuitry required. The snubbing circuitry supporting the high frequency bi-directional transformer is beyond the level of detail for this block diagram and outside the scope of this application.

Figure 2K:
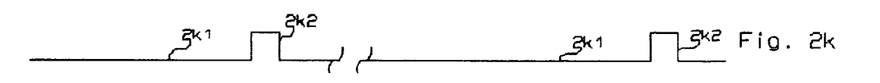

Once the secondary winding of the transformer is excited with a corresponding pulse for each primary pulse as noted in FIG. 2k, the function of the dc filter 31 is to rectify the pulse with filtering. The resultant dc is fed through 34 back to the input 1. With input to output power levels being fairly high, the source impedance at 1 is low and reduces the requirement for excess filtering within 31.

The function of the bi-directional forward converter is twofold. One function would be to clamp the transistors 7 and 8 output to the neutral after the high voltage power pulse is applied to the load and this would ensure that protection diodes 9 and 10 would be reversed biased thereby guaranteeing that irregardless of load, the waveform would be consistent. The other function of the bi-directional forward converter is that when both transistors 7 and 8 are nonconducting, any residual energy maintained as a result of the load, specifically inductive load, would be converted to a useable dc and fed back to the input at 1.

Figure 3A:
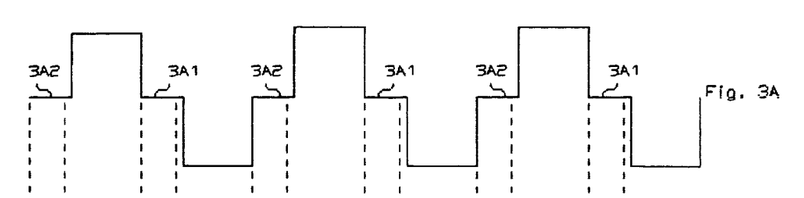
FIG. 3A shows the final modified sine wave output to the load.
Figure 3B:
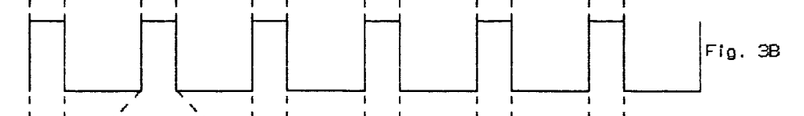
FIG. 3B shows the coincidental timing of the generated snubber pulse internal to the pulse wave shaper for suppression of the output at the trailing edge of the positive output power pulse.
Figure 3C:
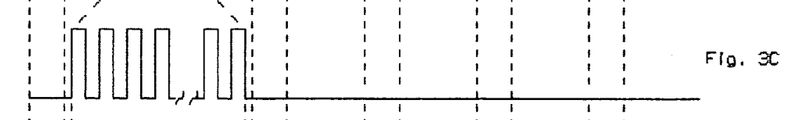
FIG. 3C shows the transistor base drive corresponding to the snubber pulse in FIG. 3B.
Figure 3D:
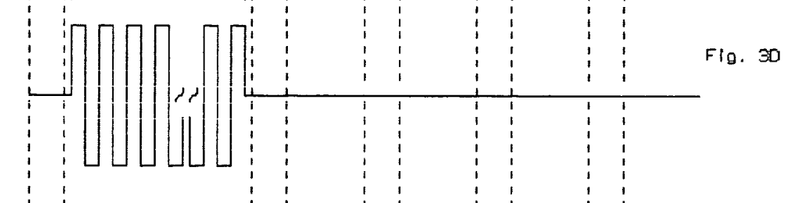
FIG. 3D shows the collector voltage at the bi-directional snubber transformer coincidental with the base drive in FIG. 3C.
Figure 3E:
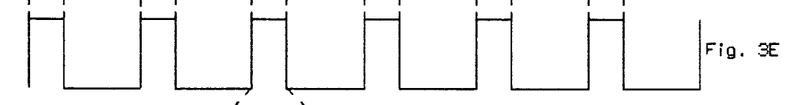
FIG. 3E shows the coincidental timing of the generated snubber pulse internal to the pulse wave shaper for suppression of the output at the trailing edge of the negative output power pulse.
Figure 3F:
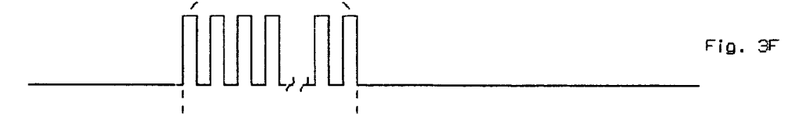
FIG. 3F shows the transistor base drive corresponding to the snubber pulse in FIG. 3E.
Figure 3G:
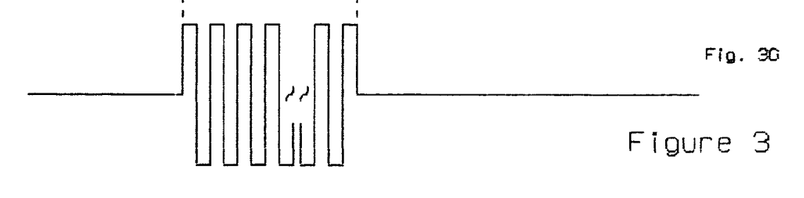
FIG. 3G shows the collector voltage at the bi-directional snubber transformer coincidental with the base drive in FIG. 3F.

FIG. 3A shows the half bridge output producing a modified sine wave where entities 3A1 and 3A2 depict the neutral dead time period between the positive and negative power pulses. The gating period, FIG. 3B, eminating from the pulse wave shaper, 22a is coincidental with both neutral dead times 3A1 and 3A2 and within this gating period is a succession of pulses, FIG. 3C, produced by the snubber pulse generator, 22c. This output, 23, is to drive transistor 36 alone where its junction at winding 29 can be seen in FIG. 3D. The gating period, FIG. 3E, emanating from the pulse wave shaper, 22b, is again coincidental with both neutral dead times 3A1 and 3A2 and again within this gating period is a succession of pulses, FIG. 3F, that are produced by the snubber pulse generator, 22c at output 24. Here transistor 35 is driven and its junction at winding 28 is seen in FIG. 3G.

SUPPORTING EMBODIMENTS—FIG. 1 AND FIG. 4

The following text within this section demonstrates the improvement of performance with the inclusion of this invention and references will be made to both FIG. 1 and FIG. 4. However, before addressing the improvement, viewing output wave shapes excluding this invention makes clear the level of improvement once the invention is applied.

Figure 4A:
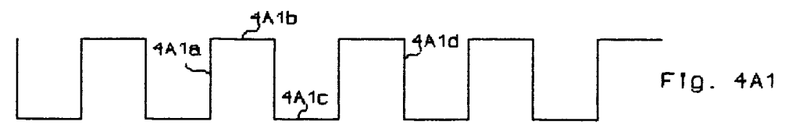

FIG. 4A1 is the output of the half bridge converter completely unloaded. Transition 4A1a occurs when transistor 8 of FIG. 1 is off, charge remains on capacitor 6, and transistor 7 is turned on. Once transistor 7 is on, the output remains high to the level shown at 4A1b and will remain high by diode 9 of FIG. 1 even when transistor 7 is off. Transition to the negative supply, 4A1d will only happen when transistor 8 is turned on and will remain at level 4A1C by diode 10 after transistor 8 is turned off.

Figure 4A:
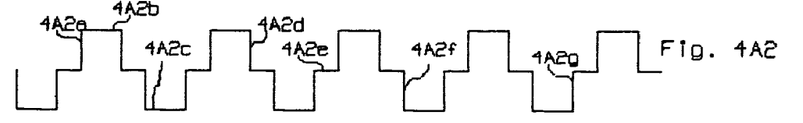

FIG. 4A2 is the output of the half bridge converter with a purely resistive load applied. Originating from the neutral state 4A2e, transition 4A2a will occur when transistor 7 is turned on to the level of 4A2b. When transistor 7 is turned off, and due to the output resistive load, diode 9 will eventually become reversed biased and the output would return to neutral state 4A2e. Once transistor 8 is turned on via transition 4A2f, the output like before would be clamped to the negative voltage 4A2c. Again due to the output resistive load, diode 10 would become reversed biased and the output would transition by way of 4A2g to return to neutral state 4A2e.

Figure 4A:
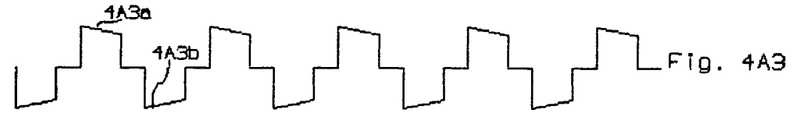
Figure 4A:
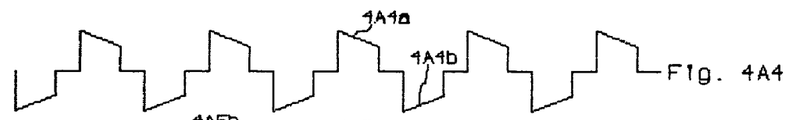

FIG. 4A3 follows 4A2 because it too is a resistive load however less resistance in value. The wave shape from 4A2 basically remains unchanged except for some decay in the positive and negative supplies, 4A3a and 4A3b respectively. This is attributed to the decay in voltage from capacitors 5 and 6. FIG. 4A4 is a more severe case from FIG. 4A3 due to the output load being less resistive. Again, the slope of outputs 4A4a and 4A4b are increasing.

Figure 4A:
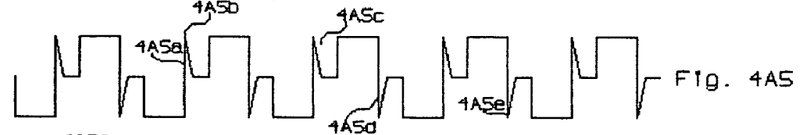

With the application of a mild inductive load as seen in FIG. 4A5, the baseline waveform of 4A2 remains unchanged. Due to stored energy within the inductive load, and upon removal of the negative supply would create a reverse voltage transition, 4A5a, to some arbitrary value 4A5b between neutral and the positive supply, 4A2b. Once peaked, the voltage would eventually ramp towards the neutral 4A5c due to the loads internal resistance. Conversely, if the positive voltage were removed from the inductive load, there too would be a reverse voltage transition 4A5d that would proportionally attain an arbitrary value 4A5e between neutral and the negative supply, 4A2c.

Figure 4A:
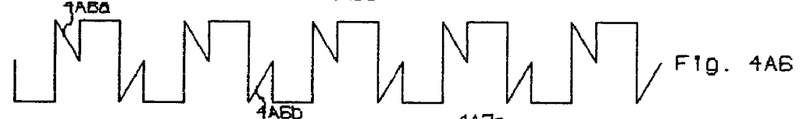
Figure 4A:
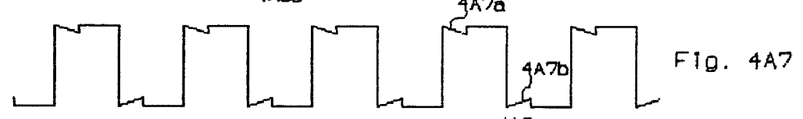

With a single inductive load having a fixed internal resistance and yet an increasing reactance, the reverse voltage transitions would ultimately peak at the opposing supply voltages. FIGS. 4A6 and 4A7 show variations in slopes 4A6a, 4A6b and 4A7a, 4A7b respectively. Note that the rms voltage at the load has changed drastically when comparing the waveform of FIG. 4A2 to FIG. 4A7.

Figures 4A, 4A:
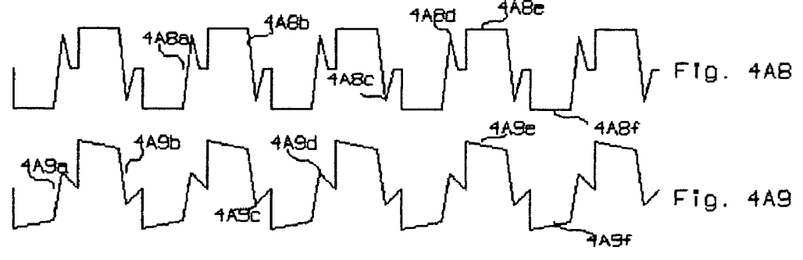

FIG. 4A8 shows the output of the half bridge converter less the inclusion of this invention loaded with an inductive load in conjunction with a parallel resistance of medium resistance. Note that transitions 4A8a and 4A8b peak at respective levels 4A8c and 4A8d with slew rates attributed to solely the load resistance. Supply levels 4A8e and 4A8f diminish also with time however during the on time of transistors 7 and 8 of FIG. 1 respectively. FIG. 4A9 is an elaboration of FIG. 4A8 where the load is configured in the same manner however the load resistance is less in value.

Transitions 4A9a and 4A9b have increased slew rates solely attributed to the load resistor however now the peaks 4A9c and 4A9d have diminished amplitudes. Again, supply levels 4A9a and 4A9b decrease in value with time at an increased rate during the conduction of transistors 7 and 8 of FIG. 1.

FIGS. 4A1 through 4A9 summarize the variations of output waveforms of the half bridge converter when producing a modified sine wave less the inclusion of this invention. Note that with these deviations in the output waveform result with an rms value that could substantially vary. FIGS. 4B1 through 4B9 correlate directly with 4A1 through 4A9 but show the improvement in output with the inclusion of this invention and result with a more consistent rms value.

Figure 4B:
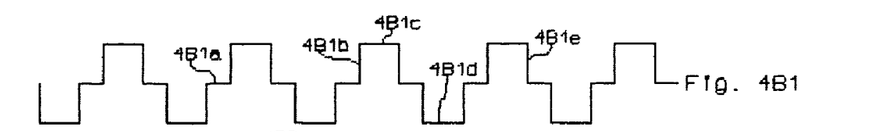
Figure 4B:
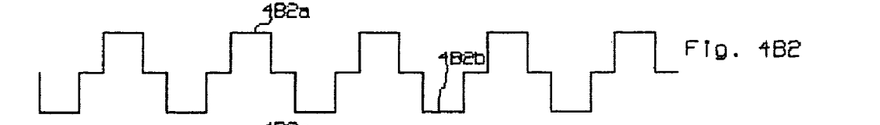
Figure 4B:
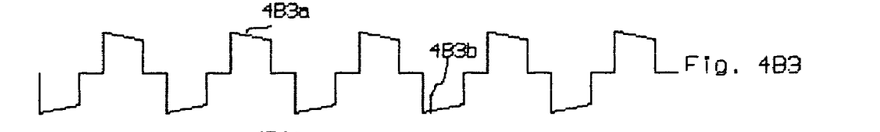
Figure 4B:
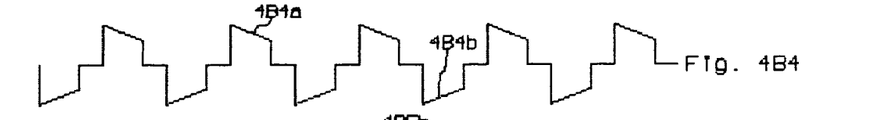

Completely unloaded as shown in FIG. 4B1, and when transistors 7 and 8 are not conducting, the bi-directional forward converter returns the output by 4B1 e to its neutral value 4B1a by immediately reverse biasing diodes 9 and 10. Given that the gating of the bi-directional forward converter ends prior to the conduction of transistors 7 and 8 allows transition 4B1b and its complement to traverse in its normal manner. With no load applied, capacitors 5 and 6 remain fully charged thereby keeping 4B1c and 4B1d at a residual level during the gating period of transistors 7 and 8.

FIGS. 4B2, 4B3 and 4B4 correlate respectively to 4A2, 4A3 and 4A4 with a purely resistive load applied to the output in conjunction with the bi-directional forward converter for active snubbing. Although snubbing is not required with the application of a resistive load, the activity of this invention ensures transitions from output high levels to neutral state with predictable slew rates. Load variations affect only levels 4B2a and 4B2b when lightly loaded, levels 4B3a and 4B3b for medium loads, and levels 4B4a and 4B4b for heavy loads. Variations of the output rms value will be solely dependent upon the value of capacitors 5 and 6 of FIG. 1.

Figure 4B:
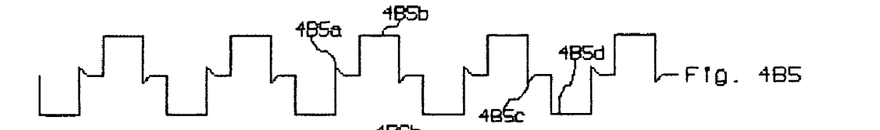
Figure 4B:
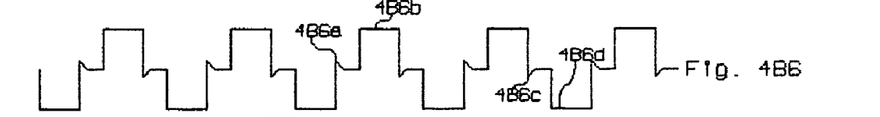
Figure 4B:
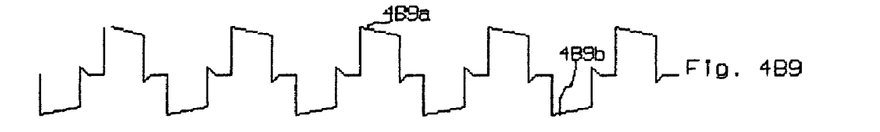
Figures 4B, 4B:
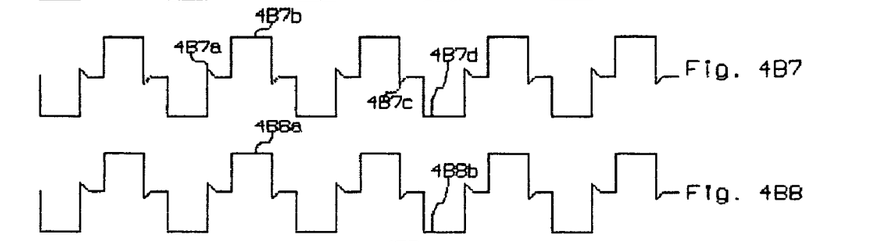

FIGS. 4B5, 4B6 and 4B7 show the output of the half bridge converter producing a modified sine wave for a purely inductive load of respective increasing values of its reactance. Peak levels 4B5a, 4B5c, 4B6a, 4B6c, 4B7a, and 4B7c remain at the same value and the waveform basically stays unchanged while the load reactance could again vary substantially. The small peaks represented by 4B5a, is a result of the primary inductance of the bi-directional forward converter being driven by the first portion of a series of high current pulses. As each pulse emanates from the snubber pulse generator further reduces the amplitude of the inductive load reverse voltage transition by absorbing its energy and transforming to a voltage useable at the input of the inverter. Output levels 4B5b, 4B5d, 4B6b, 4B6d, 4B7b, and 4B7d all will have amplitudes that correspond to the voltages maintained by capacitors 5 and 6 and may diminish with time pending the power level of the output load.

FIGS. 4B8 and 4B9 correlate respectively with 4A8 and 4A9 where the half bridge converter is loaded with an inductive reactance and parallel resistive load decreasing in value. Amplitudes 4B8a, 4B8b, 4B9a, and 4B9b will only experience a change due to the decrease in output resistance and the bi-directional forward converter will suppress any reverse voltage transitions produced by the inductive load. Again the same initial spike from 4B5a results from the few drive pulses suppressing the output and its amplitude dependent upon the loaded primary inductance of the bi-directional forward converter.

ADDITIONAL SUPPORTING EMBODIMENTS—FIG. 1 AND FIG. 5

The figures within FIG. 5 show the components used within the bi-directional forward converter that satisfy a given load condition. FIGS. 5A through 5C represent circuit models for operating this invention during the positive half cycle of the output and FIGS. 5D through 5F represent circuit models for operating this invention during the negative half cycle of the output. When combined produce a circuit model that leaves independent the operation of this invention for addressing both the positive and negative half cycles of the output.

Figure 5A:
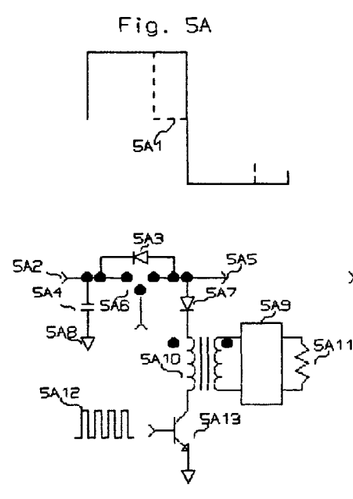
FIG. 5A shows the circuit equivalent that maintains output wave shape integrity when a positive pulse emanates from the output of the half bridge converter in an unloaded condition.

FIG. 5A shows the positive output of the half bridge converter in an unloaded condition. Time period 5A1 denotes the dead time for which the output is to remain at its neutral state. With the application of a series of drive pulses 5A12 emanating from the output of the snubber pulse generator 22c in FIG. 1, allows transistor 5A13 to actively switch bi-directional transformer 5A10 and conducts current flow through diode 5A7. With transistor 5A6 in its off state, the output 5A5 is dropped to the point of reverse biasing diode 5A3 from its cathode voltage at 5A2 which is sustained by capacitor 5A4. Having the neutral 5A8 connected to the emitter of transistor 5A13 completes the circuit and as the output 5A5 voltage is dropping, the transformed voltage at 5A10 is rectified and filtered at 5A9 prior to being returned to the inverter input. Resistor 5A11 is a simple representation of the input to the inverter.

Figure 5B:
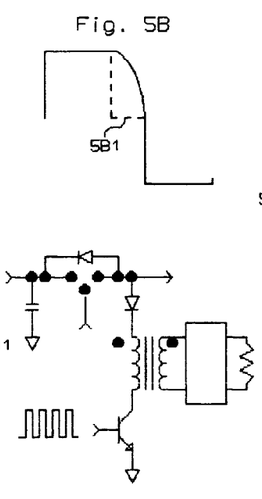
FIG. 5B shows the circuit equivalent that maintains output wave shape integrity when a positive pulse emanates from the output of the half bridge converter with a resistive load.

FIG. 5B shows the positive output of the half bridge converter while subjected to a purely resistive load. Again time period 5B1 denotes the dead time for which the output is to remain at its neutral state. The model used within FIG. 5B replicates that of FIG. 5A and suppression of the output during dead time 5B1 is accomplished in the same manner. Wave shape integrity of the positive pulse will remain independent of the applied load.

Figure 5C:
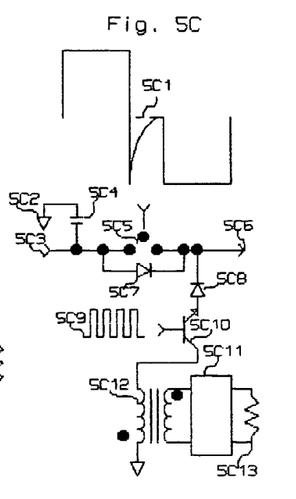
FIG. 5C shows the circuit equivalent that maintains output wave shape integrity when a positive pulse emanates from the output of the half bridge converter with an inductive load.

FIG. 5C shows the positive output of the half bridge converter when subjected to an inductive load. During the neutral state dead time 5C1, the positive output traverses to a negative value thereby employing an alternate model for output suppression. With 5C6 at a negative level and with the application of a series of consecutive drive pulses 5C9 emanating from the output of the snubber pulse generator 22c in FIG. 1, permits transistor 5C10 and diode 5C8 to pull output 5C6 positive to the neutral state also held at 5C2. The inductive reverse voltage that will result across the primary of the bi-directional transformer 5C12 will be transformed to its common secondary where it will be rectified and filtered at 5C11. Resistor 5C13 replicates 5A11 within FIG. 5A and performs as a simple representation of the input to the inverter. Once diode 5C7 is reversed biased at its anode voltage 5C3 sustained by capacitor 5C4 will allow transformer model 5C12 to deplete the stored energy maintained within the inductive load. The resultant wave shape of the positive half cycle when the output is subjected to an inductive load will be identical to that wave shape when the output is resistive.

Figure 5D:
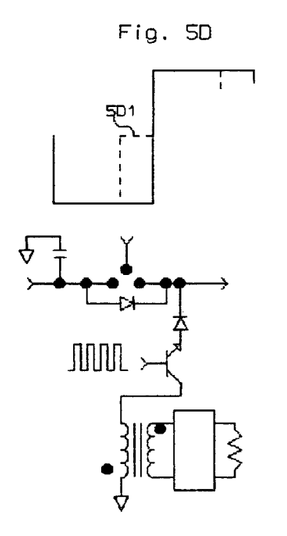
FIG. 5D shows the circuit equivalent that maintains output wave shape integrity when a negative pulse emanates from the output of the half bridge converter in an unloaded condition.

FIG. 5D addresses the negative half cycle output of the half bridge converter under a no load condition and makes reference to those identical components used for modeling the circuit as shown in FIG. 5C. With the gating of a series of consecutive drive pulses 5C9 emanating from the output of the snubber pulse generator 22c of FIG. 1 and coincidental with the output dead time 5D1, permits transistor 5C10 to traverse the output voltage across transformer 5C12 as before in a pulse-by-pulse fashion. Immediately diode 5C7 will become reversed biased and with the power drive transistor 5C5 in its off state, clamp the output to its neutral point.

Figure 5E:
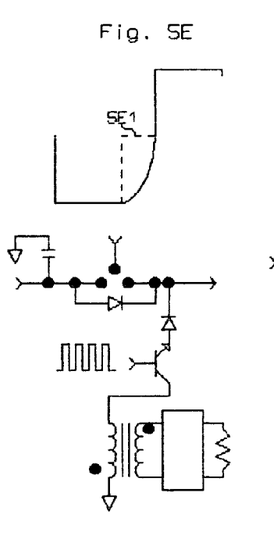
FIG. 5E shows the circuit equivalent that maintains output wave shape integrity when a negative pulse emanates from the output of the half bridge converter with a resistive load.

FIG. 5E is identical to 5D however a resistive load is applied to the output. In lieu of having the negative half cycle output drop to the neutral point by its external load, the gating of a series of consecutive drive pulse 5C9 coincidental with the output dead time 5E1 will drop the output by driving transistor 5C10. Traversing the residual output voltage on a pulse by pulse basis across transformer 5C12 and pending the overall primary inductance of transformer 5C12 will decay the negative voltage in an expedient manner while transforming it to a positive voltage useable at the inverter input.

Figure 5F:
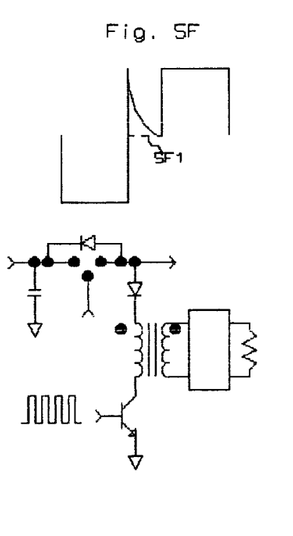
FIG. 5F shows the circuit equivalent that maintains output wave shape integrity when a negative pulse emanates from the output of the half bridge converter with an inductive load.

FIG. 5F addresses the negative half cycle output of the half bridge converter when subjected to an inductive load creating a positive voltage transition. The circuit model enacted for proper representation replicates that used within FIG. 5A. With the gating of a series of consecutive drive pulses 5A12 coincidental with dead time 5F1 enables transistor 5A13 to traverse the output voltage across the primary winding of transformer 5A10 on a pulse-by-pulse basis in a forward converter mode. This results with decay in the output voltage as current flows through diode 5A7. Once transformed to the secondary in a positive sense, it is again rectified, filtered and reutilized at the input to the inverter represented by resistor 5A11. Any reminiscence of the initial reverse voltage transition, if any, will occur at its peak amplitude time period with the suppressed resultant peak solely dependent upon the total loading induced by the transformer.

By combining both models used within FIG. 5 into one comprise the overall invention presented herein. In addition, all aspects of loading to the half bridge inverter for producing a first order approximation of a sine wave also known as a modified sine wave output have been addressed. This concludes the detailed description of the herein-stated invention.

CONCLUSION AND RAMIFICATIONS

The presented invention addresses the issue of providing a first order approximation of a sine wave at the output of a half bridge converter regardless of the load applied and provide an improved load regulation over the load range from no load to a highly reactive inductive load. Inverting dc to ac has been accomplished by many means, however load regulation performance remained questionable since most inverters addressed a single type of load. Although not specifically stated herein, output power levels for which this invention addresses is dependent more so upon the isolated dc—dc converter, which precedes the half bridge converter than the invention itself, which is the bi-directional forward converter for neutral point clamping. The intention of this invention was to primarily address power levels below one horsepower centering at the half horsepower level. The invention relates to a topology that resides at the output of the half bridge converter and power levels used within will dictate component sizes of the bi-directional forward converter transformer, drive transistors, etc., always keeping the topology in tact.

Furthermore, the bi-directional forward converter permits two means by which the degree of snubbing can be varied. One variation would be to adjust the quantity of consecutive pulses that drive the transistors. A longer pulse train would allow transient suppression over an increasing percentage of the neutral level dead time. The other variation would be to adjust the primary to secondary turns ratio so that the reflected load from the secondary onto the primary would be lowered in value. A lower turns ratio at a given transformer flux density level will yield a high voltage at the secondary. When clamped to the input of the inverter, the transformer secondary would deliver a higher current at the peak transient level and pending the turns ratio would also require a proportional higher primary current at the peak transient level. A higher primary current would preclude to an increase in active snubbing during the neutral dead time and suppress load-producing transients in a more expedient manner.

Not discussed herein were specificities such as transformer core types, required inductance factor of the core material, winding construction of the transformer, minimum requirement of primary inductance, etc. and so on. This was due to undefined areas such as required output power level, output frequency, snubber generator oscillation frequency, drive transistor gains and the like. In addition and most important not discussed due to required level of detail were design specifics that support the bi-directional forward converter transformer. These include clamp windings for the resetting of a gapless core and lower power snubbing elements that eliminate transformer transients, which ultimately protect the drive transistors and diodes. All of the aforementioned become specific design considerations when addressing the overall requirement for the inverter with the bi-directional forward converter for neutral point clamping at its output.

The invention claimed is:

1. A method by which on the output of a dc to ac inverter when used in producing a modified sine wave is clamped to a midpoint level between the voltages used within thereby providing an output waveform that remains consistent and independent of any given load comprising:

(a) a dc to dc converter that produces high differential voltages from the input of the said dc to ac inverter;

(b) a half bridge configured converter capable of supporting full power using three terminal semiconductor devices and using the said high differential voltages in (a);

(c) a pulse width modulator function as used to generate the said high differential voltages outputted from the said dc to dc converter in (a) producing a clock frequency that is a multiple of the output said modified sine wave frequency;

(d) a clock generator function that divides down the operating frequency of the said pulse width modulator in (c) to the said output said modified sine wave frequency;

(e) a pulse wave shaper function that accepts a single input from the said clock generator in (d) and provides drives for the said three terminal semiconductor devices used within the said half bridge configured converter;

(f) a snubber pulse generator function that accepts inputs from the said pulse wave shaper function in (e) and provides drives for two said three terminal semiconductor devices;

(g) a transformer having three magnetically coupled windings whereby two of the three windings are driven by the said snubber pulse generator in (f); and (h) a filtering function that accepts its input from one winding of the said transformer in (g) and has its output connected to the input of the said dc to ac inverter.

2. A transformer able to operate at a high switching frequency and at a medium to high power level with two low impedance primary windings magnetically coupled to one low impedance secondary winding wherein each primary winding has current passing within it when its associated three terminal semiconductor device closes the circuit.

3. The transformer as claimed in 2 further comprising the characteristics wherein both of the said low impedance primary windings have an identical quantity of turns, are wound in an opposing manner to one another and the said one low impedance secondary winding is wound with the same sense of only one primary winding.

4. The transformer as claimed in 2 further comprising the characteristics wherein each low impedance primary winding is magnetically coupled to the common said one low impedance secondary winding and for each positive voltage alternately induced across each said low impedance primary winding will produce a positive voltage across the common said one low impedance secondary winding that is synchronously resistively loaded thereby declaring that the said transformer is operating in the forward converter mode.

5. The transformer as claimed in 2 further comprising the characteristics wherein the said one low impedance secondary winding having its output rectified, filtered, and connected to the source input of the said dc to ac inverter thereby creating a non-dissipative load with efficient utilization of transformed energy and simultaneously reflecting back to the said low impedance primary winding a lower impedance for actively snubbing transients incurred by an output inductive load only for the duration of the output said modified sine wave deadtime.

6. Two independent directional diodes alternately biased at a high frequency for a duration in time within the said output said modified sine wave deadtime and both connected to the load whereby only one diode of the two permits current flow through its associated said primary winding of the said transformer mentioned in claim 2 pending the polarity of any transient as induced by an inductive load within the same said modified sine wave deadtime.

7. A high frequency snubber pulse generator mentioned in claim 1 that provides two outputs of which each output provides 50 or more pulses and less than 500 pulses coincidental with the said output said modified sine wave deadtime.

8. The high frequency snubber pulse generator of claim 7 further comprising a self oscillating circuit that outputs a succession of identical said pulses at a duty cycle no greater than fifty percent and for each pulse provide transition times with very high slew rates in order to sustain the pulse wave shape.

9. The high frequency snubber pulse generator of claim 7 further comprising the supply voltage and return used for creating self oscillation be obtained from the input source voltage to the said dc to ac inverter yet provide power and ground isolation when driving the output said three terminal semiconductor devices.

10. The high frequency snubber pulse generator of claim 7 further comprising an output drive that can support the controlling terminal of the said three terminal semiconductor device without distortion to the output said pulses and result with enough current capability of each said three terminal semiconductor device so that the ramping current determined by its associated said one low impedance primary winding will attain its final value.

11. The high frequency snubber pulse generator of claim 7 further comprising the characteristics wherein the succession of said identical said pulses from either of the said two outputs is initiated and coincidental with the turning off of either of the two said three terminal semiconductor devices used within the said half bridge converter.

12. The high frequency snubber pulse generator of claim 7 further comprising the characteristics wherein the output gating initiates the said output said pulses from either of the said two outputs at a time no less than one half cycle of the said high frequency snubber pulse generator frequency in order to accommodate turn off times of said either of the two said three terminal semiconductor devices used within the said half bridge converter.

13. The high frequency snubber pulse generator of claim 7 further comprising the characteristics wherein the said output gating initiates the sequence of the said output said pulses in the low state with minimal delay when driving any said three terminal semiconductor device.

* * * * *